June 30, 1942. W. L. MORRISON 2,288,538
AIR CONDITIONED RECEPTACLE
Original Filed March 5, 1934 2 Sheets-Sheet 1
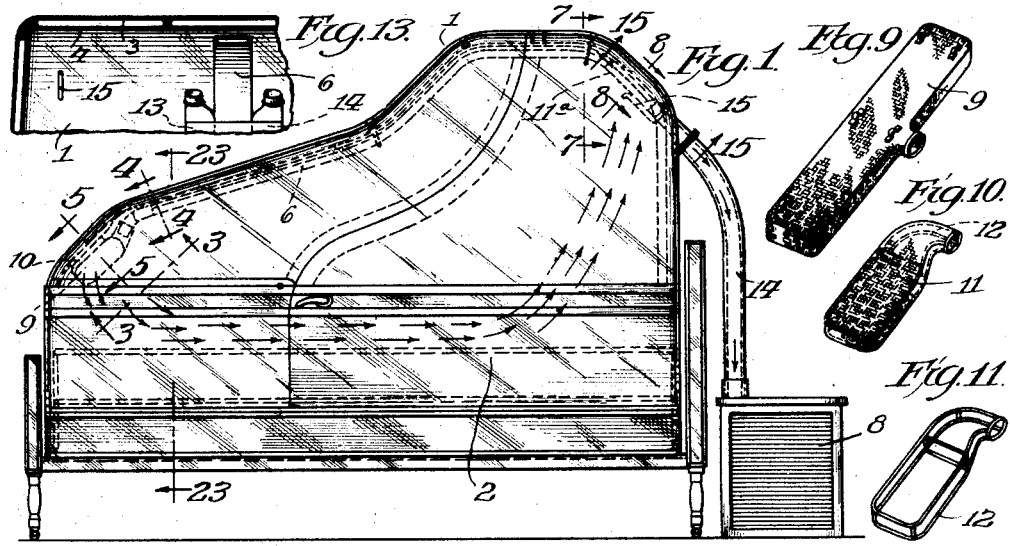
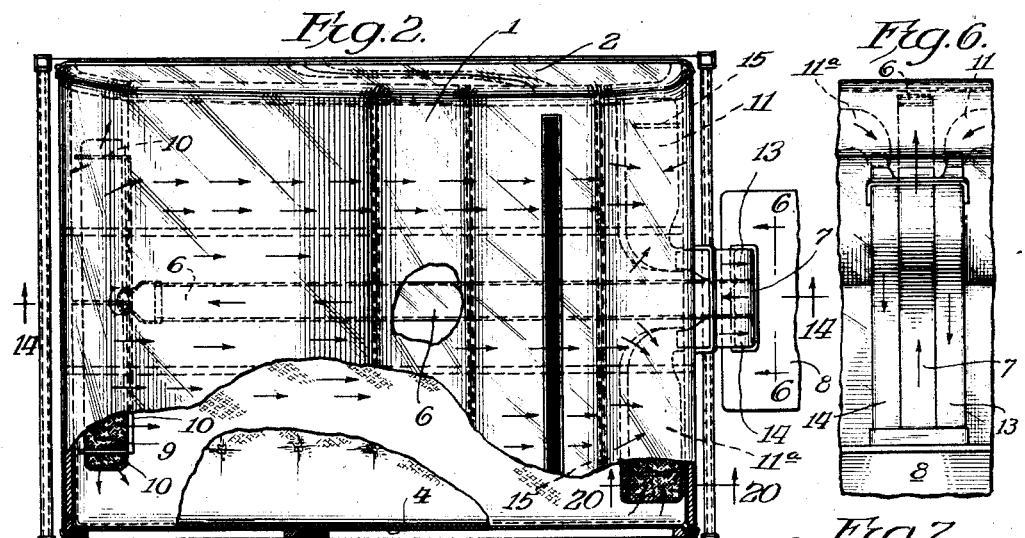
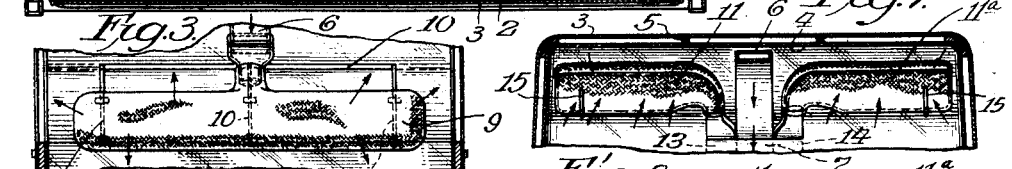
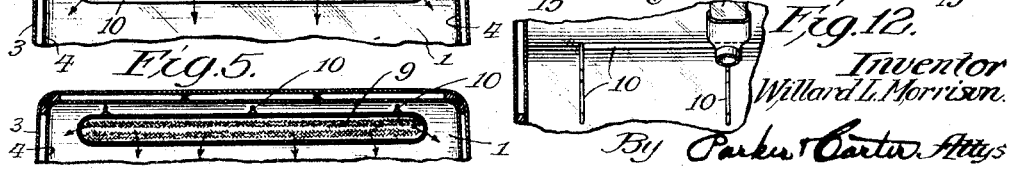
Inventor
Willard L. Morrison.
By Parker & Carter Attys

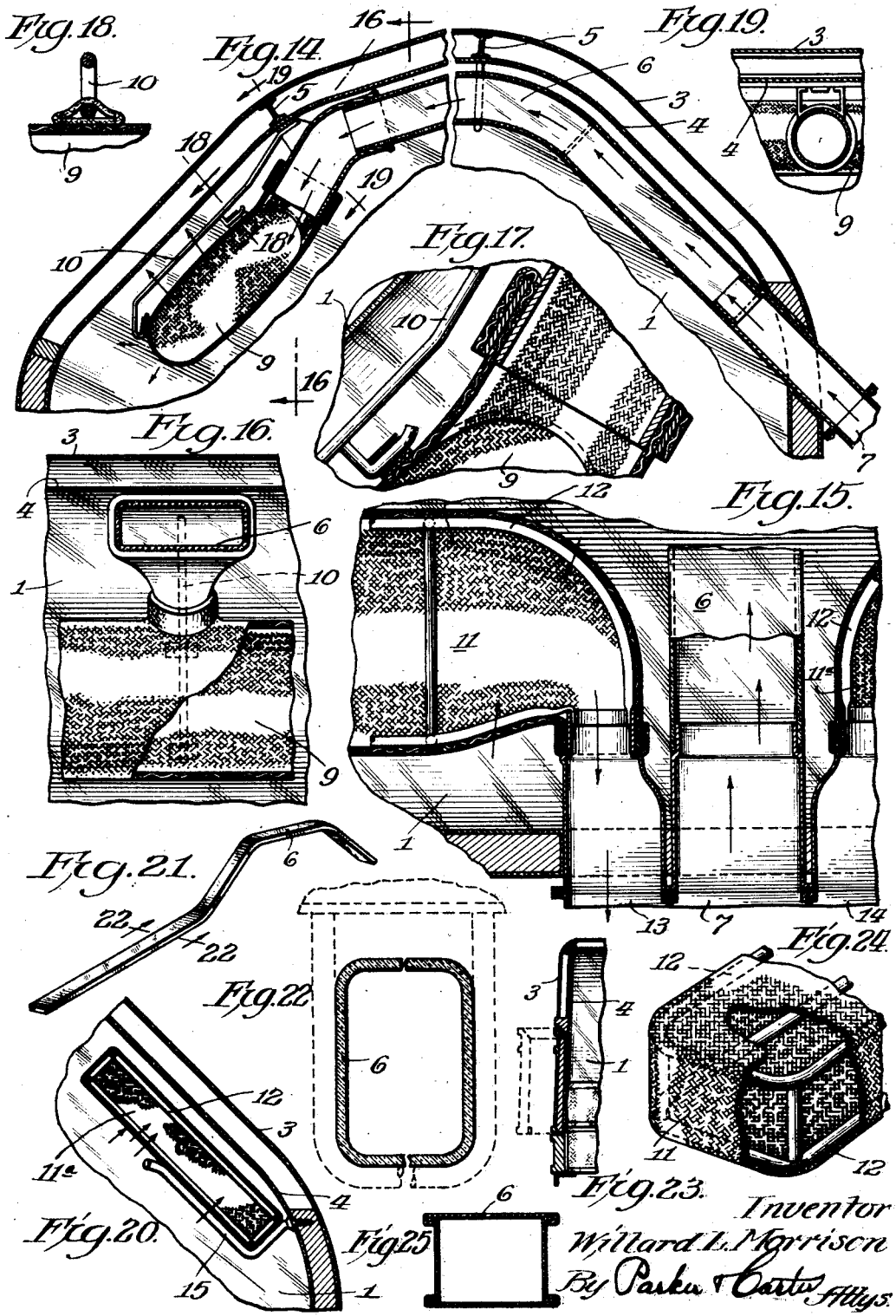

Patented June 30, 1942

2,288,538

UNITED STATES PATENT OFFICE 2,288,538

AIR CONDITIONED RECEPTACLE

Willard L. Morrison, Lake Forest, Ill.

Application March 5, 1934, Serial No. 713,991
Renewed October 26, 1938

7 Claims. (Cl. 98—1)

This invention relates to an improvement in air conditioned receptacles and has for its object to provide an improved device of this description. The invention has as a further object to provide an air conditioned receptacle provided with means for cooling the air and filtering such air. The invention has as a further object to provide an air conditioned receptacle with means for distributing the conditioned air therein. The invention has as a further object to provide an air conditioned receptacle having a plenum chamber for the inlet of the air. The invention has as a further object to provide an air conditioned receptacle wherein cool air is inserted and warm air withdrawn at the same end of the receptacle. The invention has as a further object to provide an air conditioned receptacle with means for causing the conditioned air to move in a uniform sheet or layer along the receptacle for substantially its entire width to prevent localized cool or warm areas. The invention has as a further object to provide an air conditioned receptacle with a transparent air duct extending the length thereof. The invention has as a further object to avoid the production of air currents and the stirring and mixing of the warm and foul air with the cool air in the enclosing device or compartment. The invention has other objects which are more particularly pointed out in the accompanying description.

Referring now to the drawings, Fig. 1 is a side elevation showing one form of device imparting the invention;

Fig. 2 is a plan view of the device illustrated in Fig. 1 with parts broken away;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1;

Fig. 6 is a view looking on line 6—6 in the direction of the arrows as shown in Fig. 2;

Fig. 7 is a sectional view taken on the line 7—7 of Fig. 1;

Fig. 8 is a sectional view taken on the line 8—8 of Fig. 1;

Fig. 9 is a perspective view of one form of plenum chamber distributor through which air is inserted;

Fig. 10 is a perspective view of one form of plenum chamber distributor through which air is withdrawn;

Fig. 11 is a perspective view of one form of frame for the plenum chamber shown in Fig. 10;

Fig. 12 is a view similar to Fig. 3 showing the rack into which the plenum chamber of Fig. 9 is attached;

Fig. 13 is a view similar to Fig. 12 showing the rack into which the distributor of Fig. 10 is attached;

Fig. 14 is an enlarged sectional view with parts broken away showing the plenum chamber and transparent duct;

Fig. 15 is an enlarged sectional view taken on the line 15—15 of Fig. 1;

Fig. 16 is a sectional view taken on the line 16—16 of Fig. 14;

Fig. 17 is an enlarged fragmentary view showing the connection between the plenum chamber and the rack and the fitting into which the transparent duct connects;

Fig. 18 is an enlarged sectional view taken on the line 18—18 of Fig. 14;

Fig. 19 is a sectional view taken on the line 19—19 of Fig. 14;

Fig. 20 is an enlarged sectional view on the line 20—20 of Fig. 2;

Fig. 21 is a perspective view of the transparent duct;

Fig. 22 is an enlarged sectional view on the line 22—22 of Fig. 21;

Fig. 23 is a sectional view taken on the line 23—23 of Fig. 1;

Fig. 24 is an enlarged view of the end of Fig. 10 with parts broken away; and

Fig. 25 shows a modified construction of the transparent duct.

Like numerals refer to like parts throughout the several figures.

Referring now to the drawings I have illustrated an air conditioned receptacle particularly adapted to be used in connection with a bed but it may be used in connection with a chair or other resting device for people. This receptacle comprises an enclosing device 1 with a door 2. The receptacle is preferably made of transparent material and is also preferably made of a plurality of walls 3 and 4 separated by an air space, there being separators 5 between the walls, the separators preferably being of heat non-conducting material. This transparent material may be any of the materials now on the market, such as incombustible Celluloid, Cellophane or the like.

Extending along the top of the enclosing device is a duct 6 which is also of transparent material. This duct connects at one end with a conduit 7 which leads to a source of cooled air 8 which may be any of the usual refrigerating devices now in use.

When the receptacle is used in connection with a bed, it is placed on the top of the bed so as to engage the mattress and be secured, the mattress securing the bottom of the receptacle. When used for other purposes the bottom will be secured by a heat non-conducting bottom. When the device is used for a bed, the duct 6 leads from the front of the bed to the foot thereof and is provided at the end with a plenum chamber 9 which consists of a suitable piece of fabric, preferably of close weave so as to have fine spaces or interstices between the weave to allow the air to escape into the enclosure. This plenum chamber is properly supported and connected with the end of the duct so that the cool air passing through enters the plenum chamber. The plenum chamber may, of course, be mounted or supported in any desired manner and I have shown a rack 10 with which it is connected, the rack being connected to some part of the receptacle. This plenum chamber 9 extends crosswise of the enclosing device substantially its entire width so that when the air from the duct 6 enters it such air fills the plenum chamber and then passes out through the openings therein or the spaces between the weave, thus passing out substantially across the entire width of the enclosing device and forming a layer of air which extends substantially across the enclosing device. One of the conditions which it is of vital importance to avoid is the production of air currents and the stirring and mixing of the warm and foul air with the cool air in the enclosing device or compartment. This result is secured in the present case. It will be noted that the duct 6 is much less in capacity than the plenum chamber 9 and that the discharge end of this duct is comparatively small, as shown, for example, in Figs. 3 and 16. When the cool air passes from duct 6 into plenum chamber 9 it spreads out so as to fill the chamber, and its pressure and velocity is greatly decreased. The plenum chamber being made of finely woven material, acts further to slow up or retard the velocity or movement of the cool air, so that by proper adjustment of the parts and the cooling apparatus, this cool air simply seeps out through the plenum chamber and drops by gravity into the receptacle or compartment. By this construction the cool air which is blown in from an outside source, has means inside the receptacle or compartment for slowing up or retarding the movement of the air so as to prevent air currents causing the mixing of the warm and foul air with the cool air so that the individual will be compelled to breathe this mixed warm and foul air and cool air. This is a very important factor. Air can be purified outside of the compartment or receptacle, but it must be blown from the purifying device into the receptacle and air currents are inevitable. The most important factor therefore of applicant's device is not the plenum device, but the slowing down of the movement of the air, so that it enters the receptacle or compartment without disturbing currents. At the other end of the enclosing device there is provided means for the escape of the air. For this purpose I have shown two plenum chambers 11 and 11A which are similar. These chambers are also preferably made up of cloth of fine weave and this cloth is arranged around a frame 12 which holds it in a position to form a hollow plenum chamber regardless of the air therein. The air passes through the pores or interstices and then passes out through the conduits 13 and 14 which connect with an air moving device which draws the air out, which air moving device may be a fan or blower and may be located in the chamber 8 containing the refrigerating apparatus. The plenum chambers 11 and 11A are mounted upon suitable supports such as the racks 15. The plenum chambers 11 and 11A being made of finely woven cloth and being larger than the ducts leading therefrom, act to slow up or retard the movement of the air in the receptacle or compartment. When the fan which acts to draw air through the plenum chambers 11 and 11A is not in operation, the warm air can pass out through the screen opening extending across the top of the device, as clearly shown in Fig. 2.

In the use of the device, the cooled air is passed through the duct 6 and into the plenum chamber 9 and is then spread out and passes out from the plenum chamber in a uniform sheet or layer extending substantially across the enclosing device and then passes through the enclosing device in this extended sheet or layer to the plenum chambers 11 and 11A and then out through the conduits 13 and 14. In this construction the cool air enters near the bottom of the enclosing device and passes near the bottom of the enclosing device. The air is taken out near the top so that the air will pass along the bottom and then pass up out through the plenum chambers 11 and 11A. It will be seen that by this construction the air is strained and the plenum chambers may be made such as to secure any strained result desired, making the device exceedingly efficient for people with hay fever, asthma or the like.

I claim:

1. An air conditioned receptacle comprising an enclosing device of a length horizontally longer than a normal human being and into which said human being is received, so as to be entirely enclosed by said receptacle, an air duct entering the receptacle at one end thereof and extending along the top of said receptacle above the space occupied by the human being to the other end of said receptacle and having a discharge opening at said other end, an air straining chamber at the end of said duct being larger than the duct and acting to retard the movement of the air and cause said air to spread laterally, so that it occupies a wider area than the duct, and means at the end of the enclosing device where said duct enters it, for withdrawing air from said enclosing device.

2. An air conditioned receptacle comprising an enclosing device of a length horizontally longer than a normal human being and into which said human being is received, so as to be entirely enclosed by said receptacle, an air duct entering the receptacle at one end thereof and extending along the top of said receptacle above the space occupied by the human being to the other end of said receptacle and having a discharge opening at said other end, an air straining chamber at the end of said duct being larger than the duct and acting to retard the movement of the air and cause said air to spread laterally, so that it occupies a wider area than the duct, and means at the end of the enclosing device where said duct enters it, for withdrawing air from said enclosing device, the air straining device being located below the point where the air leaves the enclosing device.

3. An air conditioned receptacle comprising an enclosing device located within a room and smaller than the room, so as to be separated from the walls of the room by air spaces, and adapted to receive a human being, an air straining device having an admission opening of less width than the straining device and positioned within the enclosing device and located near one end thereof and extending on opposite sides of the longitudinal center line of said enclosing device, so as to form an air current extending across the middle from one end to the other end of said enclosing device, a discharge device at the other end of said enclosing device, and means for introducing cooled air through said air straining device and removing warmer air through said discharge device.

4. An air conditioned receptacle comprising an enclosing device located within a room and smaller than the room, so as to be separated from the walls of the room by air spaces, and adapted to receive a human being, a straining device located therein near one end thereof and extending on opposite sides of the longitudinal center line of said enclosing device, means for inserting air in a stream of small cross sectional area into said straining device, spreading the air crosswise of the receptacle so that the current of air when it is discharged from the straining device occupies a greater width than the current entering the straining device, and a discharge opening at the other end of the enclosing device and located in a higher horizontal plane than the straining device.

5. An air conditioned receptacle comprising an enclosing device of a length horizontally longer than a normal human being and into which said human being is received, so as to be entirely enclosed by said receptacle, a duct extending along the top of said enclosing device from one end to the other, means for admitting cool air in one end of said duct, a straining device connected with the other end of said duct being larger than the duct and acting to retard the movement of the air and cause said air to spread laterally, so that it occupies a wider area than the duct, said straining device located within the enclosing device and extending substantially entirely across the space occupied by the human being so as to form an air current extending across the middle of said enclosing device above the human being, a discharge opening for the air in proximity to the end of the duct farthest from the straining device, and means for withdrawing air through said discharge opening.

6. An air conditioned receptacle comprising an enclosing device adapted to receive a human being, a duct extending along the top of said enclosing device from one end to the other, means for admitting cool air in one end of said duct, a straining device connected with the other end of said duct and located within the enclosing device and extending substantially entirely across the space occupied by the human being so as to form an air current extending across the middle of said enclosing device above the human being, a discharge opening for the air in proximity to the end of the duct farthest from the straining device, and means for withdrawing air through said discharge opening, said discharge opening being provided with an air straining device.

7. An air conditioned receptacle comprising an enclosing device adapted to receive a human being, a plenum chamber at one end thereof located above the space occupied by the human being and extending substantially entirely across said space and provided with air straining means and through which cool air is inserted in the enclosing device, a chamber at the other end of said enclosing device having air straining means located above the space occupied by the human being through which air escapes from the enclosing device, and means for withdrawing air through said latter chamber.

WILLARD L. MORRISON.